United States Patent
Nakano et al.

(10) Patent No.: US 11,182,740 B2
(45) Date of Patent: Nov. 23, 2021

(54) SKU NUMBER DETERMINATION SERVER, SYSTEM, METHOD, AND PROGRAM

(71) Applicant: NEC Corporation, Tokyo (JP)

(72) Inventors: Takayuki Nakano, Tokyo (JP); Yuuki Kubota, Tokyo (JP)

(73) Assignee: NEC CORPORATION, Tokyo (JP)

( * ) Notice: Subject to any disclaimer, the term of this patent is extended or adjusted under 35 U.S.C. 154(b) by 172 days.

(21) Appl. No.: 16/335,291

(22) PCT Filed: Sep. 15, 2017

(86) PCT No.: PCT/JP2017/033553
§ 371 (c)(1),
(2) Date: Mar. 21, 2019

(87) PCT Pub. No.: WO2018/056221
PCT Pub. Date: Mar. 29, 2018

(65) Prior Publication Data
US 2019/0279146 A1    Sep. 12, 2019

(30) Foreign Application Priority Data
Sep. 21, 2016    (JP) .............................. JP2016-183723

(51) Int. Cl.
*G06Q 30/02*    (2012.01)
*G06Q 10/08*    (2012.01)
(Continued)

(52) U.S. Cl.
CPC ..... *G06Q 10/087* (2013.01); *G06Q 10/06315* (2013.01); *G06Q 10/08* (2013.01);
(Continued)

(58) Field of Classification Search
None
See application file for complete search history.

(56) References Cited

U.S. PATENT DOCUMENTS

2001/0047293 A1*  11/2001  Waller ................. G06Q 20/203
                                                                    705/22
2004/0158501 A1     8/2004  Xin
(Continued)

FOREIGN PATENT DOCUMENTS

JP    2004-227321 A    8/2004
JP    2004-334327 A    11/2004
(Continued)

OTHER PUBLICATIONS

International Search Report for PCT Application No. PCT/JP2017/033553, dated Oct. 17, 2017.

*Primary Examiner* — Paul Danneman
(74) *Attorney, Agent, or Firm* — Sughrue Mion, PLLC

(57) ABSTRACT

A recommended SKU number calculation unit 81 calculates a recommended number of SKUs on the basis of a number of SKUs recommended in the past. A recommended SKU number transmission unit 82 transmits the calculated recommended number of SKUs to a store terminal. In addition, in the case where an adopted number of SKUs sent back from a store in response to the transmitted recommended number of SKUs changes continuously and in a consistent trend, the recommended SKU number calculation unit 81 changes the recommended number of SKUs for the store, in accordance with the trend.

10 Claims, 13 Drawing Sheets

(51) Int. Cl.
  *G06Q 10/06* (2012.01)
  *G06Q 30/06* (2012.01)

(52) U.S. Cl.
  CPC ......... *G06Q 30/02* (2013.01); *G06Q 30/0202* (2013.01); *G06Q 30/0631* (2013.01)

(56) References Cited

U.S. PATENT DOCUMENTS

2006/0195563 A1\* 8/2006 Chapin ............... H04L 67/1095
  709/223
2017/0124628 A1\* 5/2017 Kirkby ............... G06Q 30/0633

FOREIGN PATENT DOCUMENTS

JP   2004-348256 A   12/2004
JP   2009-205365 A   9/2009

\* cited by examiner

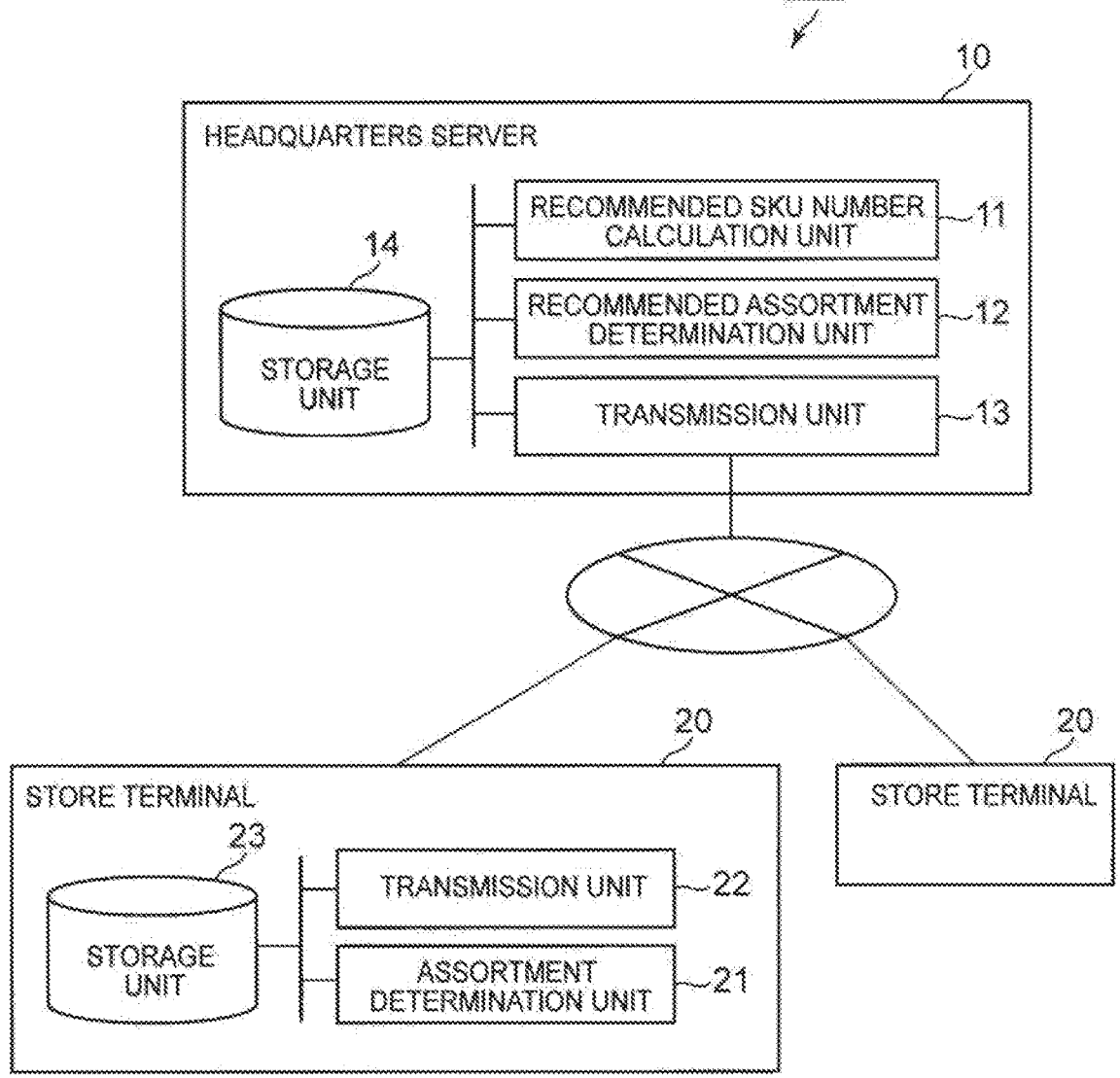

FIG. 7

|  | TUE. | WED. | THU. | FRI. | SAT. | SUN. | MON. |
|---|---|---|---|---|---|---|---|
| GINGER PORK |  |  |  | 30% | 25% | XX% | XX% |
| HIDAKA KOMBU | 20% | 15% | 10% | XX% | XX% | XX% | XX% |
| MENTAIKO | 10% | 8% | 20% | XX% | XX% | XX% | XX% |
| TORISOBORO | 5% | 10% | 10% | XX% | XX% | XX% | XX% |

STORE A RICE BALL CATEGORY ORDERABLE PRODUCT LIST

| SELECTABLE PRODUCTS | PRODUCT INFORMATION | SCORE |
|---|---|---|
| GINGER PORK | NEW PRODUCT (WITHIN THE WEEK) | 35.5 |
| HIDAKA KOMBU | NEW PRODUCT | 10.3 |
| MENTAIKO | NEW PRODUCT | 29.6 |
| TORISOBORO | NEW PRODUCT | 19.5 |
| SHRIMP MAYO | EXISTING PRODUCT | |
| OKAKA | EXISTING PRODUCT | |
| TUNA MAYO | EXISTING PRODUCT | |
| ... | | |

FIG. 8

STORE A RICE BALL CATEGORY ORDERABLE PRODUCT LIST

| SELECTABLE PRODUCTS | PRODUCT INFORMATION | SALES SCORE |
|---|---|---|
| GINGER PORK | NEW PRODUCT (WITHIN THE WEEK) | 35.5 |
| HIDAKA KOMBU | NEW PRODUCT | 10.3 |
| MENTAIKO | NEW PRODUCT | 29.6 |
| TORISOBORO | NEW PRODUCT | 19.5 |
| SHRIMP MAYO | EXISTING PRODUCT | 39.2 |
| OKAKA | EXISTING PRODUCT | 20.5 |
| TUNA MAYO | EXISTING PRODUCT | 11.6 |
| BEEF KALBI | EXISTING PRODUCT | 9.0 |
| SOCKEYE SALMON | EXISTING PRODUCT | 7.3 |
| EGG RICE (TAMAGO KAKE GOHAN) | EXISTING PRODUCT | 2.5 |
| SALMON MAYO | EXISTING PRODUCT | 1.2 |
| TAKANA | EXISTING PRODUCT | 5.2 |
| NORI | EXISTING PRODUCT | 2.1 |
| RED RICE | EXISTING PRODUCT (NO RECORD) | 5.2 |
| EGG RICE | EXISTING PRODUCT (NO RECORD) | 3.1 |
| WAKAME | EXISTING PRODUCT (NO RECORD) | 8.0 |
| UMEBOSHI | EXISTING PRODUCT (NO RECORD) | 7.2 |
| SALMON ROE | EXISTING PRODUCT (NO RECORD) | 4.4 |

| USER | PURCHASE FREQUENCY | PURCHASED PRODUCT | NUMBER OF PURCHASING TIMES |
|---|---|---|---|
| No.0001 | 10 TIMES | TAKANA | SIX TIMES |
|  |  | NORI | FOUR TIMES |
| No.0002 | FIVE TIMES | RED RICE | ONCE |
|  |  | SHRIMP MAYO | THREE TIMES |
| No.0003 | 13 TIMES | SALMON | 13 TIMES |
| ... | ... | ... |  |

FIG. 11

STORE A RICE BALL CATEGORY ORDERABLE PRODUCT LIST

| SELECTABLE PRODUCTS | PRODUCT INFORMATION | SALES SCORE | REPEAT SCORE |
|---|---|---|---|
| GINGER PORK | NEW PRODUCT (WITHIN THE WEEK) | 35.5 | - |
| HIDAKA KOMBU | NEW PRODUCT | 10.3 | - |
| MENTAIKO | NEW PRODUCT | 29.6 | - |
| TORISOBORO | NEW PRODUCT | 19.5 | - |
| SHRIMP MAYO | EXISTING PRODUCT | 39.2 | 89 |
| OKAKA | EXISTING PRODUCT | 20.5 | 72 |
| TUNA MAYO | EXISTING PRODUCT | 11.8 | 131 |
| BEEF KALBI | EXISTING PRODUCT | 9.0 | 34 |
| SOCKEYE SALMON | EXISTING PRODUCT | 7.3 | 50 |
| WAKAME | EXISTING PRODUCT | 2.5 | 34 |
| UMEBOSHI | EXISTING PRODUCT | 1.2 | 4 |
| TAKANA | EXISTING PRODUCT | 7.3 | 64 |
| NORI | EXISTING PRODUCT | 2.1 | 50 |
| RED RICE | EXISTING PRODUCT (NO RECORD) | 5.2 | - |
| EGG RICE | EXISTING PRODUCT (NO RECORD) | 3.1 | - |
| SALMON MAYO | EXISTING PRODUCT (NO RECORD) | 8.0 | - |
| CHICKEN WITH VEGETABLES | EXISTING PRODUCT (NO RECORD) | 7.2 | - |
| SALMON ROE | EXISTING PRODUCT (NO RECORD) | 4.4 | - |

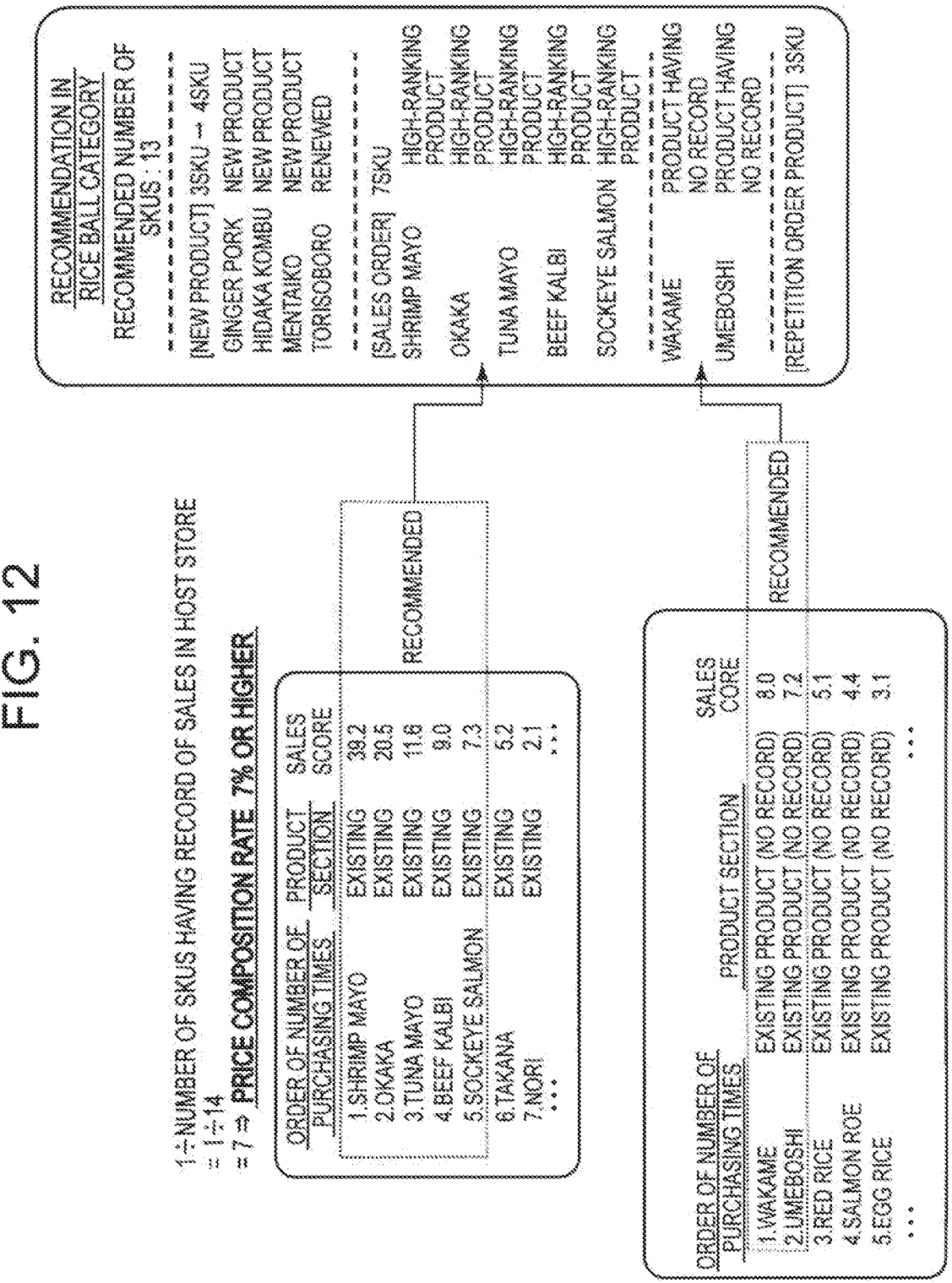

SKU NUMBER DETERMINATION SERVER, SYSTEM, METHOD, AND PROGRAM

This application is a National Stage Entry of PCT/JP2017/033553 filed on Sep. 15, 2017, which claims priority from Japanese Patent Application 2016-183723 filed on Sep. 21, 2016, the contents of all of which are incorporated herein by reference, in their entirety.

TECHNICAL FIELD

The present invention relates to a server that determines the number of SKUs recommended for each store, a system, a method, and a program therefor.

BACKGROUND ART

In a business form in which a large number of stores are managed on the headquarters side, the number of stock keeping units (SKUs) for each store is periodically determined depending on the scale of the store as an operation in order to increase the sales through inventory management of appropriate products. In addition, an assortment recommended for each store is determined on the headquarters side as an operation to enable the assortment to be used as guidelines for ordering.

Patent Literature (PTL) 1 describes a system which optimizes products in stock. The system described in PTL 1 selects products to be assorted from respective product classifications different in impression on the basis of product classification made by differences in customers' impression of the products at the time of assortment.

CITATION LIST

Patent Literature

PTL 1: Japanese Patent Application Laid-Open No. 2009-205365

SUMMARY OF INVENTION

Technical Problem

In the case of a large number of stores under management, it is difficult for the headquarters to figure out fine situations of all stores (for example, an actual arrangement of shelves, a space in which products can be arranged, the structure of a building, and the like). Therefore, the headquarters determines the uniformly-recommended number of SKUs depending on the scale or the like of a store. Each store then corrects the number of SKUs depending on concrete situations of each store and determines an assortment to be adopted as an operation by reference to the number of SKUs and the contents of the assortment recommended by the headquarters.

The simple determination of the number of SKUs only based on the scale of the store, however, causes a gap between the determined number of SKUs and an appropriate number of SKUs. Therefore, if the recommended number of SKUs is inappropriate, the store concerned needs to correct the periodically-determined number of SKUs each time problematically. Furthermore, generally there is not performed an operation of feeding back the number of SKUs for each store to the headquarters, and therefore the headquarters cannot figure out the current number of SKUs for each store in the present situation.

On the other hand, a record of sales of each store can be acquired from point-of-sales (POS) data, and therefore the data may be used for determining the number of SKUs as another idea. The record of sales, however, is merely data acquired as a result of assortment. Naturally, products can be sold only after being displayed in a store front, and the assortment determination is a stage previous thereto and therefore it is also difficult to determine the number of SKUs from the data of the record of sales.

Furthermore, since the object of the system described in PTL 1 is to create a subjective feeling of assortment without increasing the number of types of products prepared in a store, it is difficult to determine the number of SKUs itself.

Therefore, it is an object of the present invention to provide a server, a system, a method, and a program capable of determining an appropriate number of SKUs managed by each store in a business form in which the headquarters manages respective stores.

Solution to Problem

A server according to the present invention is characterized by including: a recommended SKU number calculation unit that calculates a recommended number of SKUs on the basis of a number of SKUs recommended in the past; and a recommended SKU number transmission unit that transmits the calculated recommended number of SKUs to a store terminal, wherein, in the case where an adopted number of SKUs sent back from a store in response to the transmitted recommended number of SKUs changes continuously and in a consistent trend, the recommended SKU number calculation unit changes the recommended number of SKUs for the store in accordance with the trend.

A system according to the present invention is characterized by including a headquarters server; and a store terminal, wherein the headquarters server includes: a recommended SKU number calculation unit that calculates a recommended number of SKUs on the basis of a number of SKUs recommended in the past; and a recommended SKU number transmission unit that transmits the calculated recommended number of SKUs to the store terminal, wherein the store terminal includes an adopted SKU number transmission unit that sends back an adopted number of SKUs, which is the number of SKUs determined in each store in response to the transmitted recommended number of SKUs, to the headquarters server, and wherein, in the case where the adopted number of SKUs sent back in response to the transmitted recommended number of SKUs changes continuously and in a consistent trend, the recommended SKU number calculation unit changes the recommended number of SKUs in accordance with the trend.

A method according to the present invention is characterized by including the steps of: calculating a recommended number of SKUs on the basis of a number of SKUs recommended in the past; and transmitting the calculated recommended number of SKUs to a store terminal, wherein, in the case where an adopted number of SKUs sent back from a store in response to the transmitted recommended number of SKUs changes continuously and in a consistent trend, the recommended number of SKUs for the store is changed in accordance with the trend.

A recommended SKU determination method according to the present invention is characterized by that: a headquarters server calculates a recommended number of SKUs on the basis of a number of SKUs recommended in the past; the headquarters server transmits the calculated recommended number of SKUs to a store terminal; the store terminal sends back an adopted number of SKUs, which is the number of SKUs determined in each store in response to the transmitted recommended number of SKUs, to the headquarters server; and, in the case where the adopted number of SKUs sent back in response to the transmitted recommended number of SKUs changes continuously and in a consistent trend, the headquarters server changes the recommended number of SKUs in accordance with the trend.

A program according to the present invention is characterized by causing a computer to perform: recommended SKU number calculation processing of calculating a recommended number of SKUs on the basis of a number of SKUs recommended in the past; and recommended SKU number transmission processing of transmitting the calculated recommended number of SKUs to a store terminal, wherein, in the case where an adopted number of SKUs sent back from a store in response to the transmitted recommended number of SKUs changes continuously and in a consistent trend, the recommended number of SKUs for the store is changed in accordance with the trend in the recommended SKU number calculation processing.

Advantageous Effects of Invention

According to the present invention, an appropriate number of SKUs managed by each store is able to be determined in a business form in which the headquarters manages respective stores.

BRIEF DESCRIPTION OF DRAWINGS

FIG. 1 is a block diagram illustrating an exemplary embodiment of an inventory management system according to the present invention.

FIG. 2 is an explanatory diagram illustrating an example of the timing at which assortment recommendation processing is performed.

FIG. 7 is an explanatory diagram illustrating an example of processing of calculating a new product score.

FIG. 8 is an explanatory diagram illustrating an example of a calculation result of a sales trend score.

FIG. 11 is an explanatory diagram illustrating an example in which calculated repeat scores are associated with the sales scores of existing products.

FIG. 12 is an explanatory diagram illustrating an example of processing of selecting sales order products.

DESCRIPTION OF EMBODIMENT

Figure 3:
FIG. 3 is an explanatory diagram illustrating an example of an orderable product list.

Hereinafter, an exemplary embodiment of the present invention will be described with reference to appended drawings.

FIG. 1 is a block diagram illustrating an exemplary embodiment of an inventory management system according to the present invention. An inventory management system 100 of this exemplary embodiment includes a headquarters server 10 and a store terminal 20. The headquarters server 10 is a device used on the headquarters side managing respective stores. Moreover, the store terminal 20 is a device used in each store managed by the headquarters. Although two store terminals 20 are illustrated in FIG. 1, the number of store terminals 20 is not limited to two, but may be one, or may be three or more.

The headquarters server 10 determines the number of SKUs for each category recommended (hereinafter, referred to as "recommended number of SKUs") for each store and a recommended assortment in response to a headquarters' instruction. In this exemplary embodiment, the headquarters server 10 determines the recommended number of SKUs and the recommended assortment for each category every week and then transmits them to the store terminal 20. Since the headquarters server 10 manages the inventory of each store, the headquarters server 10 may be also referred to as "inventory management server." In addition, since recommending products to be assorted, the headquarters server 10 may also be referred to as "assortment recommendation device."

Moreover, each store uses the store terminal 20 to fix the assortment and the number of SKUs for each category finally adopted by each store (hereinafter, the number of SKUs is referred to as "adopted number of SKUs") with consideration for the recommended number of SKUs and the recommended assortment. The products to be assorted are previously classified into categories by property or the like.

In addition, considering the time to order placement and the like, the assortment recommendation processing is performed in a week immediately before a recommendation target week. FIG. 2 is an explanatory diagram illustrating an example of the timing at which assortment recommendation processing is performed. For example, in the case where a unit for the recommendation target week ranges from Tuesday to Monday as illustrated in FIG. 2, the assortment recommendation processing is performed, for example, on Tuesday in the previous week. In the following description, the recommendation target week is referred to as "Nth week." Moreover, a week previous to the recommendation target week is referred to as "(N−1)th week." Similarly, the weeks subsequent to the recommendation target week are referred to as "(N+1)th week," "(N+2)th week," and the like.

Although the following description is made assuming that a target period (unit) during which the recommended number of SKUs is calculated is one week, the period (unit) is not limited to one week, but may be, for example, one day (24 hours).

Referring to FIG. 1, the headquarters server 10 includes a recommended SKU number calculation unit 11, a recommended assortment determination unit 12, a transmission unit 13, and a storage unit 14.

The storage unit 14 stores various data used for calculating the recommended number of SKUs and for determining the recommended assortment. The storage unit 14 stores, for example, a sales result or a product master of a product, a product on which emphasis is put for management, measure information, and the like. The storage unit 14 is implemented by a magnetic disk or the like. Incidentally, the storage unit 14 may be included in a device (not illustrated) other than the headquarters server 10 connected through a communication network.

The recommended SKU number calculation unit 11 creates an orderable product list in the recommendation target week. The method of creating the orderable product list is arbitrary. The recommended SKU number calculation unit 11 may create the orderable product list by listing all products orderable in the recommendation target week or may create the orderable product list by intentionally removing some products.

FIG. 3 is an explanatory diagram illustrating an example of an orderable product list. In the example illustrated in FIG. 3, an orderable product list is generated for each category (rice ball category, sushi category) of each store. The orderable product list may include information on the products (for example, new product, existing product, and the like) along with orderable (selectable) products.

The recommended SKU number calculation unit 11 calculates the recommended number of SKUs by category of each store. First, the recommended SKU number calculation unit 11 calculates the recommended SKUs for each store on the basis of the number of SKUs recommended in the past. Specifically, the recommended SKU number calculation unit 11 acquires the recommended number of SKUs for each category of each store in the (N−1)th week stored in the storage unit 14 and then sets the number as a reference to the recommended number of SKUs. In the case of a store not having the number of SKUs recommended in the past (for example, in the case where there is no recommended number of SKUs for the (N−1)th week), the recommended SKU number calculation unit 11 may determine the recommended number of SKUs in the (N−1)th week of a store similar in scale and locational conditions or the like to the store as a reference.

The viewpoints for deciding whether or not the store is similar in scale include, for example, a store floor area, the number of products handled, an area of a parking lot, an area of a storage room, the number of employees, and the like. If the contents thereof are within a predetermined range, the recommended SKU number calculation unit 11 may decide that the store is a similar store.

Furthermore, the viewpoints for deciding whether or not the store is similar in locational conditions include, for example, a distance from a station and a situation of a facing road (the number of lanes, a traffic volume, or the like), a business district or a residential area, the presence or absence of a parking space, the number of neighboring competing stores, and the like. The recommended SKU number calculation unit 11 may decide whether the store is a similar store by deciding whether these contents coincide with predetermined conditions and whether the coincident conditions are within a predetermined range.

Subsequently, the recommended SKU number calculation unit 11 acquires an actual value of the adopted number of SKUs by category for each store until the (N−1)th week. Specifically, the recommended SKU number calculation unit 11 acquires the adopted number of SKUs sent back in response to the transmitted recommended number of SKUs. The actual value of the adopted number of SKUs by category for each store is transmitted at a predetermined timing from the store terminal 20 to the headquarters server 10 and then stored in the storage unit 14.

In the case where the adopted number of SKUs sent back in response to the transmitted recommended number of SKUs changes continuously and in a consistent trend, the recommended SKU number calculation unit 11 changes the recommended number of SKUs in accordance with the trend. Specifically, in the case where the adopted number of SKUs, which has been sent back from the store terminal in response to the transmitted recommended number of SKUs, increased at least twice continuously, the recommended SKU number calculation unit 11 increases the recommended number of SKUs for the store. On the other hand, in the case where the adopted number of SKUs, which has been sent back from the store terminal in response to the transmitted recommended number of SKUs, decreased at least twice continuously, the recommended SKU number calculation unit 11 decreases the recommended number of SKUs for the store.

For example, in the case where the adopted number of SKUs of the category was changed to increase at least twice continuously with respect to the recommended number of SKUs, the recommended SKU number calculation unit 11 corrects the recommended number of SKUs of the category for the store used for a reference so as to be increased. On the other hand, in the case where the adopted number of SKUs of the category was changed to decrease at least twice continuously with respect to the recommended number of SKUs, the recommended SKU number calculation unit 11 corrects the recommended number of SKUs of the category for the store used for a reference so as to be decreased.

The method of determining the number of SKUs to be increased or decreased is arbitrary. The recommended SKU number calculation unit 11 may correct the recommended number of SKUs according to a predetermined number or rate (a rate of change or a rate of decrease), for example, independently of a difference between the recommended number of SKUs and the adopted number of SKUs. Moreover, the number of times for determining the continuous increase or decrease is not limited to twice, but may be three or more times.

Figure 4:
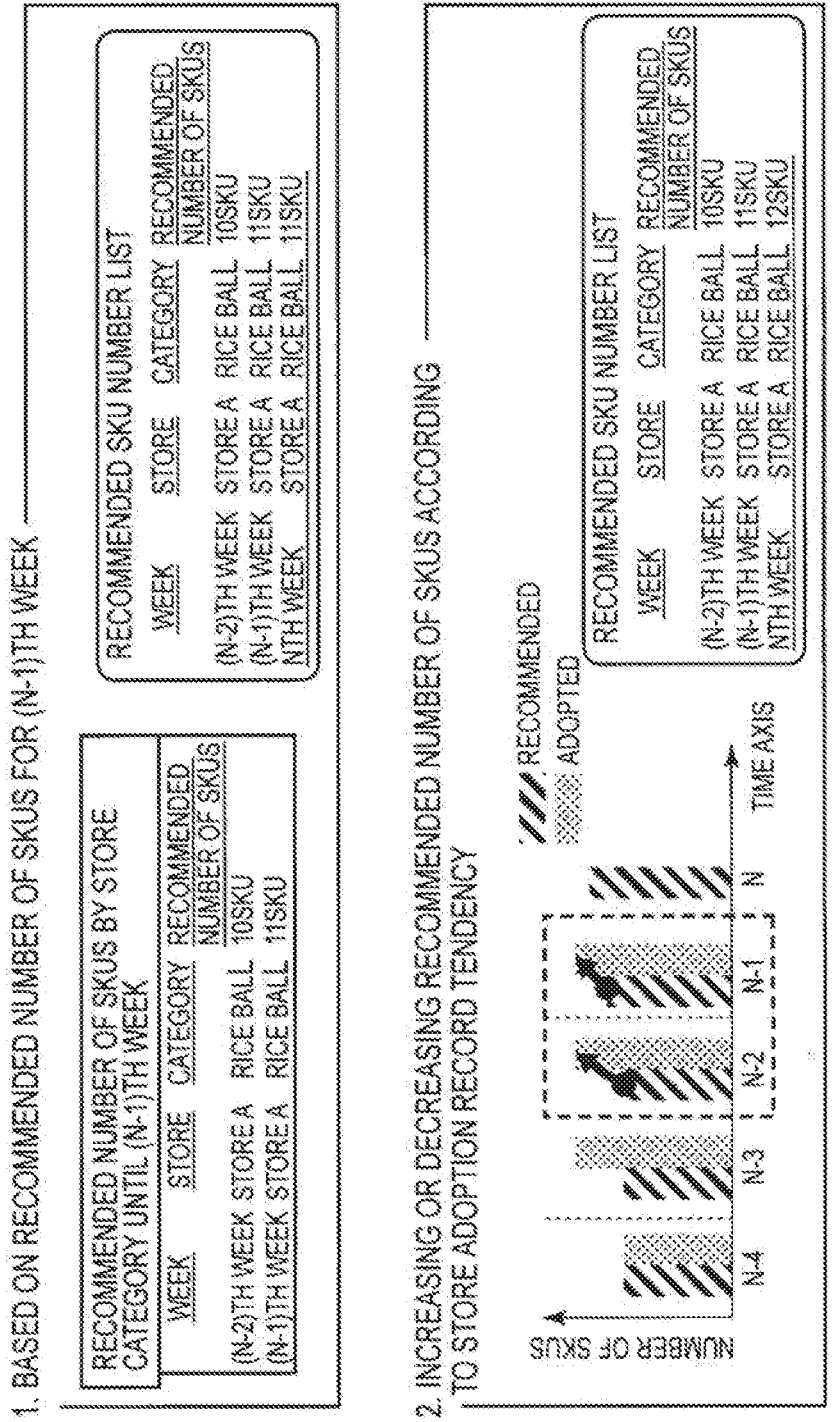
FIG. 4 is an explanatory diagram illustrating an example of processing of correcting a recommended number of SKUs.

FIG. 4 is an explanatory diagram illustrating an example of processing of correcting a recommended number of SKUs. First, the recommended SKU number calculation unit 11 determines the number of SKUs of the Nth week from the recommended number of SKUs by store category of the (N−1)th week. In the example illustrated in FIG. 4, the recommended number of SKUs by store category of the (N−1)th week is 11, and therefore the recommended number of SKUs of the Nth week used as a base is determined to be 11.

The recommended SKU number calculation unit 11 then increases or decreases the recommended number of SKUs according to a store adoption record tendency. In the example illustrated in FIG. 4, the recommended number of SKUs is changed to increase the adopted number of SKUs by comparison with the recommended number of SKUs by store category of the (N−2)th week and that of the (N−1)th week. Therefore, the recommended SKU number calculation unit 11 increments the recommended number of SKUs of the Nth week by one.

Since the recommended SKU number calculation unit 11 corrects the recommended number of SKUs on the basis of the store adoption record tendency in this manner, the manipulations of correcting the adopted number of SKUs on the basis of the recommended number of SKUs on the store side can be reduced.

Furthermore, in the case where the degree of variation in demand prediction exceeds a predetermined threshold value, the recommended SKU number calculation unit 11 corrects the recommended number of SKUs in accordance with the degree. Specifically, in the case where the degree of variation obtained by comparing the demand prediction number of the Nth week (hereinafter, referred to as "first demand prediction") with the demand prediction number of the (N+1)th week (hereinafter, referred to as "second demand prediction") exceeds a predetermined threshold value, the recommended SKU number calculation unit 11 increases or decreases the predetermined recommended number of SKUs in accordance with the varying direction (the increasing or decreasing direction) and the degree thereof. In other words, if a degree of variation in the second demand prediction relative to the first demand prediction exceeds the threshold value, the recommended SKU number calculation unit 11 corrects the calculated number of SKUs in accordance with the degree.

In the following description, a variability rate will be described as an example of the degree of variation. The value of the degree of variation used in this exemplary embodiment is not limited to the variability rate as long as the level of change in demand prediction can be measured. For example, the difference between the first and second demand predictions may be used as the degree of variation.

Specifically, in the case where the degree of increase in the second demand prediction relative to the first demand prediction exceeds a threshold value (hereinafter, referred to as "first threshold value"), the recommended SKU number calculation unit 11 revises the calculated recommended number of SKUs so as to increase. On the other hand, in the case where the degree of decrease in the second demand prediction relative to the first demand prediction exceeds a threshold value (hereinafter, referred to as "second threshold value"), the recommended SKU number calculation unit 11 revises the calculated recommended number of SKUs so as to decrease.

The demand prediction number is calculated by using a prediction model for predicting the number of demands for each store and for each category. The content of the prediction model and a learning method are arbitrary. For example, data of sales results, weather forecasts, prediction of the number of customers, and the like are used for learning. The variability rate indicating an example of the degree of variation is calculated by using the following equation 1, for example.

Variability rate=(Demand prediction number of (*N*+1)th week−Demand prediction number of*N*th week)÷Demand prediction number of*N*th week    (Equation 1)

Moreover, the recommended SKU number calculation unit 11 receives the adopted number of SKUs sent back from the store terminal 20 for the calculated recommended number of SKUs and calculates a threshold value by using the following equation 2, for example.

Threshold value=1÷Adopted number of SKUs    (Equation 2)

In the case where the variability rate exceeds the threshold value calculated by using the above equation 2, the recommended SKU number calculation unit 11 corrects the calculated number of SKUs according to the variability rate. Specifically, in the case where the variability rate of the recommended number of SKUs increases and exceeds the first threshold value, the recommended SKU number calculation unit 11 increases the recommended number of SKUs. In the case where the variability rate of the recommended number of SKUs decreases and exceeds the second threshold value, the recommended SKU number calculation unit 11 decreases the recommended number of SKUs. Incidentally, the threshold value calculated by using the above equation 2 may be set for either of the first and second threshold values.

Figure 5:
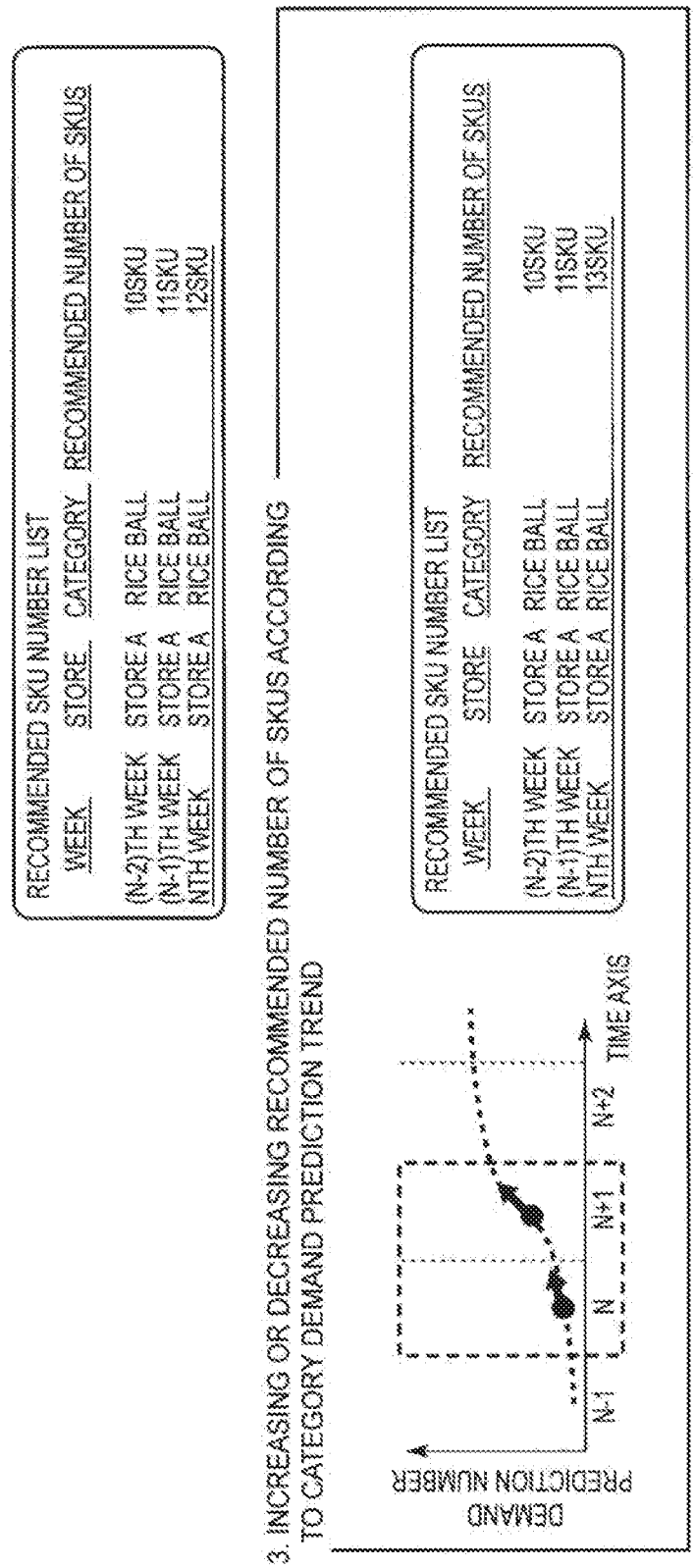
FIG. 5 is an explanatory diagram illustrating another example of processing of correcting the recommended number of SKUs.

FIG. 5 is an explanatory diagram illustrating another example of processing of correcting the recommended number of SKUs. First, the recommended SKU number calculation unit 11 acquires the demand prediction number of the week (Nth week) for determining the recommended number of SKUs. Furthermore, the recommended SKU number calculation unit 11 acquires the demand prediction number of the (N+1)th week. Subsequently, the recommended SKU number calculation unit 11 calculates the variability rate of the demand prediction number of the Nth and (N+1)th weeks by using, for example, the above equation 1.

Since a demand trend indicated by a dotted line is predicted in the example illustrated in FIG. 5, the recommended SKU number calculation unit 11 may acquire the demand prediction numbers of the Nth and (N+1)th weeks to calculate a future demand prediction trend. Incidentally, the upper and lower limit values of the recommended number of SKUs may be previously provided to prevent the recommended number of SKUs from being radically corrected.

Since the recommended SKU number calculation unit 11 corrects the recommended number of SKUs on the basis of the demand prediction trend in this manner, the trend of the demand prediction can be reflected by the recommended number of SKUs. This enables a reduction in the manipulations of correcting the adopted number of SKUs on the store side.

For example, the demand for seasonal products or the like may change abruptly. Since the recommended SKU number calculation unit 11 is able to previously correct the recommended number of SKUs on the basis of a demand prediction in this exemplary embodiment, each store is able to follow the change.

Incidentally, the recommended SKU number calculation unit 11 may correct the recommended number of SKUs on the basis of only one of the store adoption record tendency and the demand prediction trend or may correct the recommended number of SKUs on the basis of both of the tendency and the trend. In addition, the recommended number of SKUs may be corrected in an arbitrary order. Specifically, the recommended SKU number calculation unit 11 may carry out the correction based on the store adoption record tendency before the correction based on the demand prediction trend or may carry out the correction based on the demand prediction trend before the correction based on the store adoption record tendency.

The recommended SKU number calculation unit 11 determines the recommended number of SKUs and thereupon prorates the recommended number of SKUs for each assortment section. The rate by which the prorating is performed is predetermined for each assortment section. In this exemplary embodiment, there are set up three types of assortment sections: "new product," "sales order product," and "repetition order product." The assortment section classification method, however, is not limited thereto and the sections to be set up are not limited to three types of sections.

The term "new product" in the assortment section means a product to be added to the SKUs anew. The term "sales order product" means a product for a target of assortment determination in the order of sales price. The "sales order product" includes both of a product having a record of sales in the past and a product having no record of sales in the past. The term "repetition order product" in the assortment section means a product selected for an assortment for regular customers (repeat users).

Figure 6:
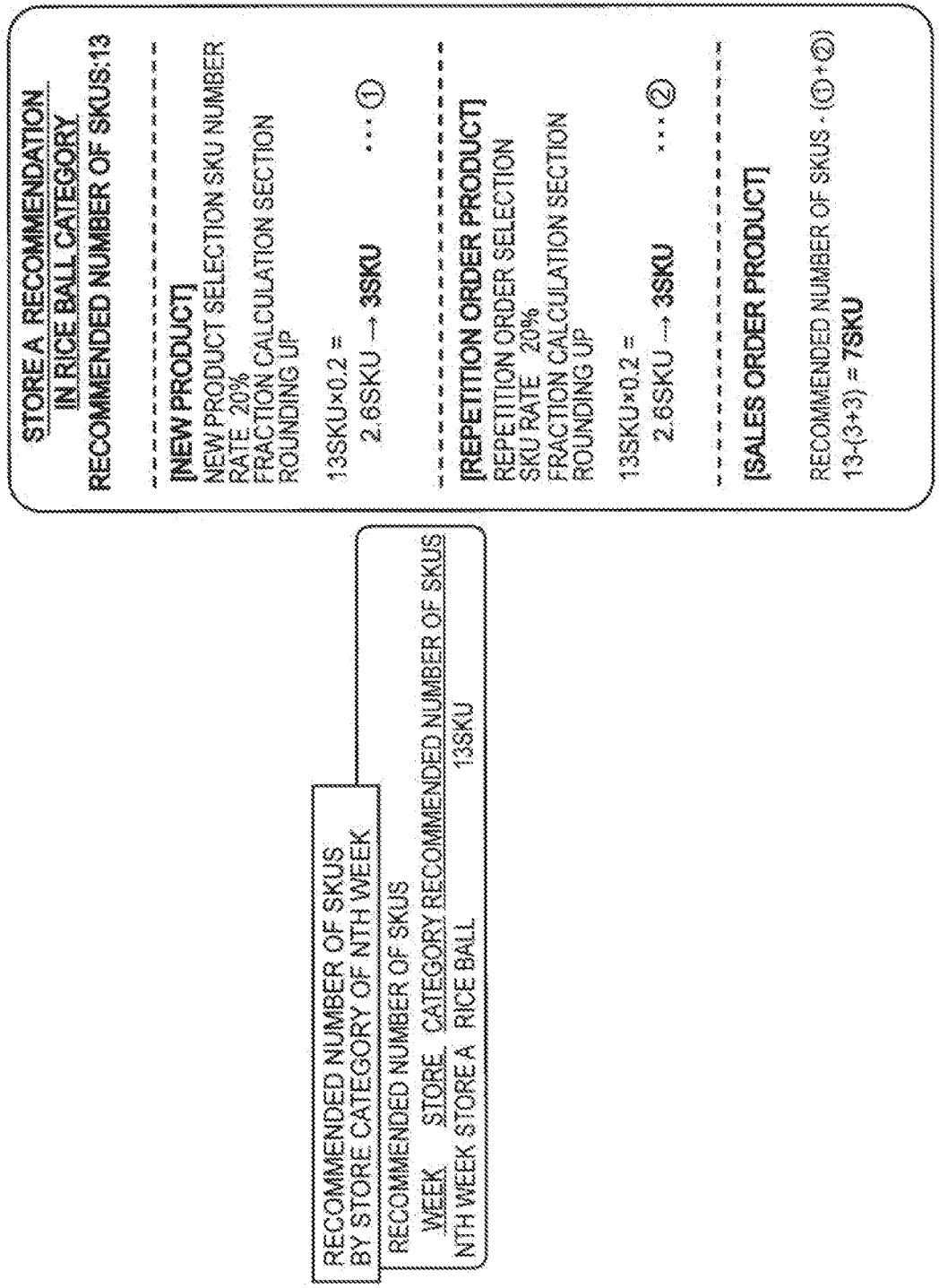
FIG. 6 is an explanatory diagram illustrating an example of processing of calculating the recommended number of SKUs for each assortment section.

FIG. 6 is an explanatory diagram illustrating an example of processing of calculating the recommended number of SKUs for each assortment section. For example, the recommended number of SKUs for a rice ball category of store A is assumed to be determined as 13. Moreover, the pro rata rates of "new product," "sales order product," and "repetition order product" are assumed to be predetermined as 20%, 60%, and 20%, respectively.

First, the recommended SKU number calculation unit 11 calculates the recommended number of SKUs for the new product. Specifically, the recommended SKU number calculation unit 11 multiplies the pro rata rate of "new product" by the recommended number of SKUs to calculate the recommended number of SKUs for the new product (hereinafter, referred to as "new product selection SKU number"). A way of handling of values after the decimal point (any one of rounding up, rounding down, and rounding off) may be previously determined.

In the example illustrated in FIG. 6, it is determined that a calculation is performed by rounding up a value. Therefore, the recommended SKU number calculation unit 11 calculates 13×0.2=2.6 and determines the new product selection SKU number to be 3.

The recommended SKU number calculation unit 11 then compares the calculated recommended number of SKUs $\alpha$ for the new product with the number of SKUs for the new product of the Nth week. If the calculated recommended number of SKUs $\alpha$ for the new product is greater than the number of SKUs for the new product of the Nth week ($\alpha$>the number of SKUs for the new product), the recommended SKU number calculation unit 11 determines the number of SKUs for the new product as the new product selection SKU number. On the other hand, if the calculated recommended number of SKUs $\alpha$ for the new product is equal to or less than the number of SKUs for the new product of the Nth week ($\alpha \leq$ the number of SKUs for the new product), the recommended SKU number calculation unit 11 determines $\alpha$ as the new product selection SKU number.

Subsequently, the recommended SKU number calculation unit 11 calculates the recommended number of SKUs for the repetition order product. Specifically, similarly to the case of "new product," the recommended SKU number calculation unit 11 calculates the recommended number of SKUs for the repetition order product (hereinafter, referred to as "repetition order product selection SKU number") by multiplying the pro rata rate of "repetition order product" by the recommended number of SKUs.

In the example illustrated in FIG. 6, similarly to the case of the new product, the recommended SKU number calculation unit 11 calculates 13×0.2=2.6 and determines the repetition order product selection SKU number as 3.

Subsequently, the recommended SKU number calculation unit 11 calculates the recommended number of SKUs for the sales order product. The recommended SKU number calculation unit 11 calculates the recommended number of SKUs for the sales order product by subtracting the new product selection SKU number and the repetition order product selection SKU number, which have already been obtained, from the recommended number of SKUs.

In the example illustrated in FIG. 6, the recommended SKU number calculation unit 11 subtracts 3 as the new product selection SKU number and 3 as the repetition order product selection SKU number from 13 as the recommended number of SKUs to calculate the recommended number of SKUs for the sales order product to be 7.

The recommended assortment determination unit 12 identifies target products for each assortment section and calculates the scores of the identified products for each section. The recommended assortment determination unit 12 calculates a new product score, a sales trend score, and a repetition degree score for each of the assortment sections, "new product," "sales order product," and "repetition order product," respectively.

First, the recommended assortment determination unit 12 calculates the new product score. Specifically, the recommended assortment determination unit 12 calculates the sales price composition information of a single item for a new product orderable in the Nth week and calculates the new product score on the basis of the price indicated by the calculated composition information.

The sales price composition information may be, for example, a sales amount itself of a product or may be an amount obtained by multiplying a profit margin of a product by a sales amount. In addition, the sales price composition information may be a sales price composition rate, which is calculated by "the sales amount of a product/the sales amount of a target product group (for example, a product group in the same category)."

In the following description, there is illustrated a case where a sales price composition rate is used as the sales price composition information. Moreover, this exemplary embodiment will be described by giving an example of a case of predicting a sales price composition rate of a single item of the product by using a prediction model (a single item sales price composition rate prediction model). The prediction model to be used, however, is not limited to a model of predicting the single item sales price composition rate, as long as the model is used to predict the aforementioned sales price composition information. The single item sales price composition rate prediction model is previously learned and prepared on the basis of data such as a sales result, sales information, product characteristics, a calendar, store information, blackout date information, a weather forecast, and the like. For learning of the prediction model, an arbitrary method may be used.

FIG. 7 is an explanatory diagram illustrating an example of processing of calculating a new product score. In the example illustrated in FIG. 7, the single item sales price composition rate prediction model is assumed to predict a single item sales price composition rate each day. First, the recommended assortment determination unit 12 predicts a daily single item sales price composition rate of the Nth week by using the single item sales price composition rate prediction model. In the example illustrated in FIG. 7, it is assumed that new products of four types of rice balls such as "ginger pork (Buta Syougayaki)," "Hidaka Kombu (seaweed)," "Mentaiko (spicy cod roe)," and "Torisoboro (minced chicken)" are present and the diagram illustrates that "ginger pork" is offered for sale from Friday.

Subsequently, the recommended assortment determination unit 12 calculates an average value of the single item sales price composition rate for each product of the Nth week as a new product score. The example in FIG. 7 illustrates that the new product scores of the rice balls "ginger pork," "Hidaka Kombu," "Mentaiko," and "Torisoboro" are calculated to be 35.5, 10.3, 29.6, and 19.5, respectively.

In this exemplary embodiment, the recommended assortment determination unit 12 calculates scores on the basis of the sales price composition rate, thereby preventing a lot of inexpensive products only from being selected.

Subsequently, the recommended assortment determination unit 12 calculates sales trend scores. Specifically, the recommended assortment determination unit 12 calculates the sales price composition rate of each of products having a record of sales in the host store and products having no record of sales in the host store for each store and then calculates a sales trend score on the basis of the calculated composition rate. In the above, the term "product having no record of sales" means a product having no record of sales for a target period. Moreover, a store as a target of calculating the sales trend score (in other words, a store for which the assortment is recommended) is sometimes referred to as "target store."

First, the recommended assortment determination unit 12 calculates the sales price composition rate of a product having a record of sales in the host store. For the product having a record of sales in the host store (target store), a past record of sales (for example, a sales price record by date, by store, and by product) is present. Therefore, the recommended assortment determination unit 12 calculates the sales price composition rate of the product having a record of sales in the target store (hereinafter, referred to as "first composition rate") as a sales trend score on the basis of the record of sales of the target store for the predetermined past period. Since the first composition rate indicates sales price composition information, it can be referred to as "first composition information." Specifically, the recommended assortment determination unit 12 calculates the sales price composition rate for each day, each store, and each product on the basis of the most recent past actual values to calculate a daily average value. As target past actual values, sales prices of the last two weeks (the (N−2)th and (N−1)th weeks) may be used, for example.

Subsequently, the recommended assortment determination unit 12 calculates the sales price composition rate of the product having no record of sales in the host store. For the product having no record of sales in the host store (target store), any past record of sales is not present. Therefore, the recommended assortment determination unit 12 calculates a sales price composition rate of the product having no record of sales in the target store for a predetermined past period (hereinafter, referred to as "second composition rate") on the basis of a prediction model for predicting the sales price composition rate of a single item of the product as a sales trend score. Incidentally, since the second composition rate also indicates the sales price composition information, it can be referred to as "second composition information." In this exemplary embodiment, the recommended assortment determination unit 12 predicts a sales price composition rate of a single item by using the prediction model used for calculating the new product score (a single item sales price composition rate prediction model). Specifically, the recommended assortment determination unit 12 predicts the sales price composition rate for each day, each store, and each product and then calculates a daily average value.

FIG. 8 is an explanatory diagram illustrating an example of a calculation result of a sales trend score. The products illustrated in the upper part of FIG. 8 are those having records in the host store, and the products in the lower part are those having not records. For the products in the upper part, the sales price composition rates are calculated on the basis of past actual values. For the products in the lower part, the sales price composition rates are calculated on the basis of the prediction model.

While a method of calculating the sales trend score depends on whether the product has a record in the host store or has no record in the host store, the sales trend score indicates a sales price composition rate in either case. Furthermore, generally the prediction model of a new product often includes the number of days elapsed from the sales start. Therefore, it can be said that the use of this prediction model also enables the prediction of a sales price in a period in which the trend gradually becomes stable from the start of selling the new product.

As described above, the recommended assortment determination unit 12 calculates a sales price composition rate independently of whether the product has a record of sales or not in this exemplary embodiment, by which recommended products can be compared with each other by the same criterion.

Subsequently, the recommended assortment determination unit 12 calculates a repetition degree score. First, the recommended assortment determination unit 12 determines a repeat user for each category. In this exemplary embodiment, it is assumed that the storage unit 14 stores actual data in which a number uniquely identifiable by a customer (hereinafter, referred to as "customer number") is associated with a product for sale.

Figures 9, 10:
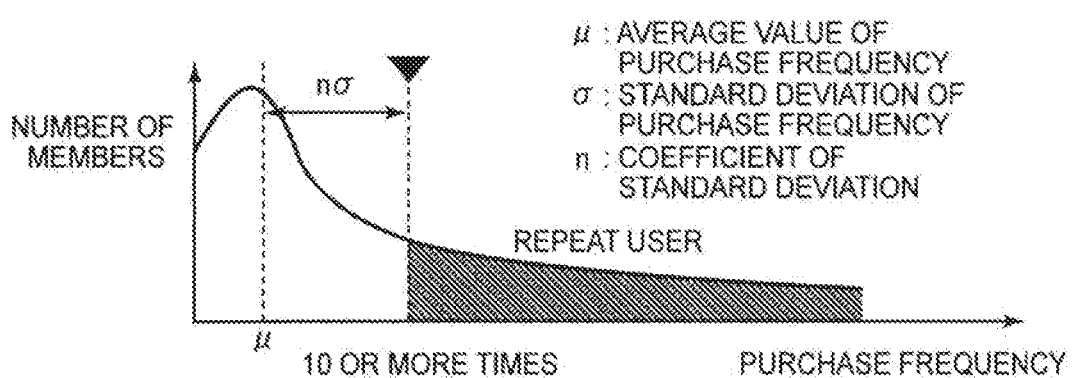
FIG. 9 is an explanatory diagram illustrating an example of a method of determining a repeat user.
FIG. 10 is an explanatory diagram illustrating an example of processing of identifying a repeat user.

The recommended assortment determination unit 12 determines a regular customer evaluation threshold value from purchase frequencies for a past predetermined period of customers in each store. FIG. 9 is an explanatory diagram illustrating an example of a method of determining a repeat user. The recommended assortment determination unit 12 determines the regular customer evaluation threshold value on the basis of, for example, an equation 3 illustrated below. Incidentally, n is a coefficient of the standard deviation and previously determined.

Regular customer evaluation threshold value=Purchase frequency average $\mu$+$n$×Purchase frequency standard deviation $\sigma$ (Equation 3)

In the example illustrated in FIG. 9, the recommended assortment determination unit 12 determines the regular customer evaluation threshold value from a purchase frequency for a predetermined period (past four weeks) and identifies a customer having purchased a product with a frequency equal to or more than a threshold value (for example, 10 or more times) as a repeat user.

The recommended assortment determination unit 12 then calculates the total number of times the determined repeat user purchased the product for the past predetermined period as a repetition degree score. FIG. 10 is an explanatory diagram illustrating an example of processing of identifying a repeat user. The example in FIG. 10 illustrates that, in the case where a customer (user) whose purchase frequency is 10 or more times is identified as a repeat user, the number of times the user purchased the product has been considered to be a target of score calculation. Moreover, FIG. 11 illustrates an example in which the calculated repeat scores are associated with the sales scores of existing products.

The recommended assortment determination unit 12 selects products to be assorted for each section on the basis of the calculated scores (the new product score, the sales trend score, and the repetition degree score). In the case of preventing new products from being not assorted, first, the recommended assortment determination unit 12 selects the new product selection SKU number of new products in descending order of the new product score.

Incidentally, in the case where new products are scheduled to be added in the middle of a target period and where the products are high-ranking in the new product score, the recommended assortment determination unit 12 may additionally select the new products to be added even if the new product selection SKU number is thereby exceeded.

Subsequently, the recommended assortment determination unit 12 selects new products of the recommended number of SKUs of the sales order products in the order of the sales trend score. Specifically, the recommended assortment determination unit 12 selects the specified number (i.e., the recommended number of SKUs of the sales order products) of products in descending order of the sales price composition rate out of the products for which the first composition rates are calculated (i.e., products having records of sales for a predetermined period) and products for which the second composition rates are calculated (i.e., products having no records of sales for a predetermined period). In other words, it can also be said that the recommended assortment determination unit 12 selects the specified number of products in descending order of price indicated by the sales price composition information out of the products for which the first composition information is calculated and products for which the second composition information is calculated.

The sales trend scores for products having records in the host store are calculated separately from those for products having no records in the host store, and it can be said that the sales trend scores based on records are more reliable. Therefore, the recommended assortment determination unit 12, first, selects targets of assortment out of the products having records of sales in the host store. In other words, the recommended assortment determination unit 12 selects products in descending order of the sales price composition rate out of the products for which the first composition rate has been calculated.

In this selection, the recommended assortment determination unit 12 may preferentially select products having records of sales to some extent to prevent only products having records in the host store from being selected. The recommended assortment determination unit 12 may, first, select only products, for example, each having a sales price composition rate equal to or more than an average (specifically, 1÷the number of SKUs each having a record of sales in the host store).

FIG. 12 is an explanatory diagram illustrating an example of processing of selecting sales order products. For example, in the case of 14 as the number of SKUs sold in the host store, the recommended assortment determination unit 12 may select products whose price composition rate is 7% or higher as high-ranking products on the basis of a calculation result of 1÷14×100≈7%. In this case, in the example illustrated in FIG. 12, the products ranked in the top five in the sales score are selected as high-ranking products out of the products having records of sales in the host store.

After selecting the products having records of sales in the host store, the recommended assortment determination unit 12 then selects assortment targets out of the products having no records of sales in the host store. In other words, in the case where the number of products whose sales price composition rate of a target store is equal to or higher than an average is less than the specified number among the products for which the first composition rate is calculated, the recommended assortment determination unit 12 selects assortment targets out of the products having no records of sales in the host store.

In this selection, the recommended assortment determination unit 12 may preferentially select products predicted to be sold to some extent to prevent products too low in records of sales from being selected. For example, similarly to the products having records of sales in the host store, the recommended assortment determination unit 12 may select only products whose predicted sales price composition rate is equal to or more than an average (specifically, 1÷the number of SKUs each having a record of sales in the host store). In the example illustrated in FIG. 12, products ranked in the top two in the sales score are selected out of the products having no records of sales in the host store.

It is also conceivable that the number of selected products is less than the recommended number of SKUs of the sales order products. As described above, while a method of calculating the sales trend score depends on whether the product has a record in the host store or has no record in the host store, the sales trend score indicates a sales price composition rate in either case. Accordingly, the recommended assortment determination unit 12 selects products ranked high in the sales score out of products not selected among the products having records of sales in the host store and the products having no records of sales in the host store until the number of selected products reaches the recommended number of SKUs of the sales order products. In other words, in the case where the number of products whose sales price composition rate of the target store is equal to or higher than an average is less than the specified number, the recommended assortment determination unit 12 selects products in descending order of the first composition rate or the second composition rate out of products, which have not been selected yet.

For example, in the example illustrated in FIG. 12, products ranked sixth or lower in the sales score are not selected among the products having records of sales in the host store. Similarly, products ranked third or lower in the sales score are not selected among the products having no record of sales in the host store. Therefore, the recommended assortment determination unit 12 selects products ranked high in the sales score in order among the products which have not been selected yet. In the example illustrating in FIG. 12, a product ranked sixth in the sales score (Takana [pickled mustard leaf] rice ball) is selected first among the products having records of sales in the host store and then a product ranked third in the sales score (red rice ball) is selected among the products having no records of sales in the host store, and so on.

Subsequently, the recommended assortment determination unit 12 selects the products of the recommended number of SKUs of the repetition order products in the order of repetition degree score. Specifically, the recommended assortment determination unit 12 selects products in descending order of the repetition degree score out of the products not having been selected yet. Due to the characteristics of the sections, even if generally-unpopular products are included, various types of products are required to be assorted for regular customers and therefore repetition order products are selected last.

Figure 13:
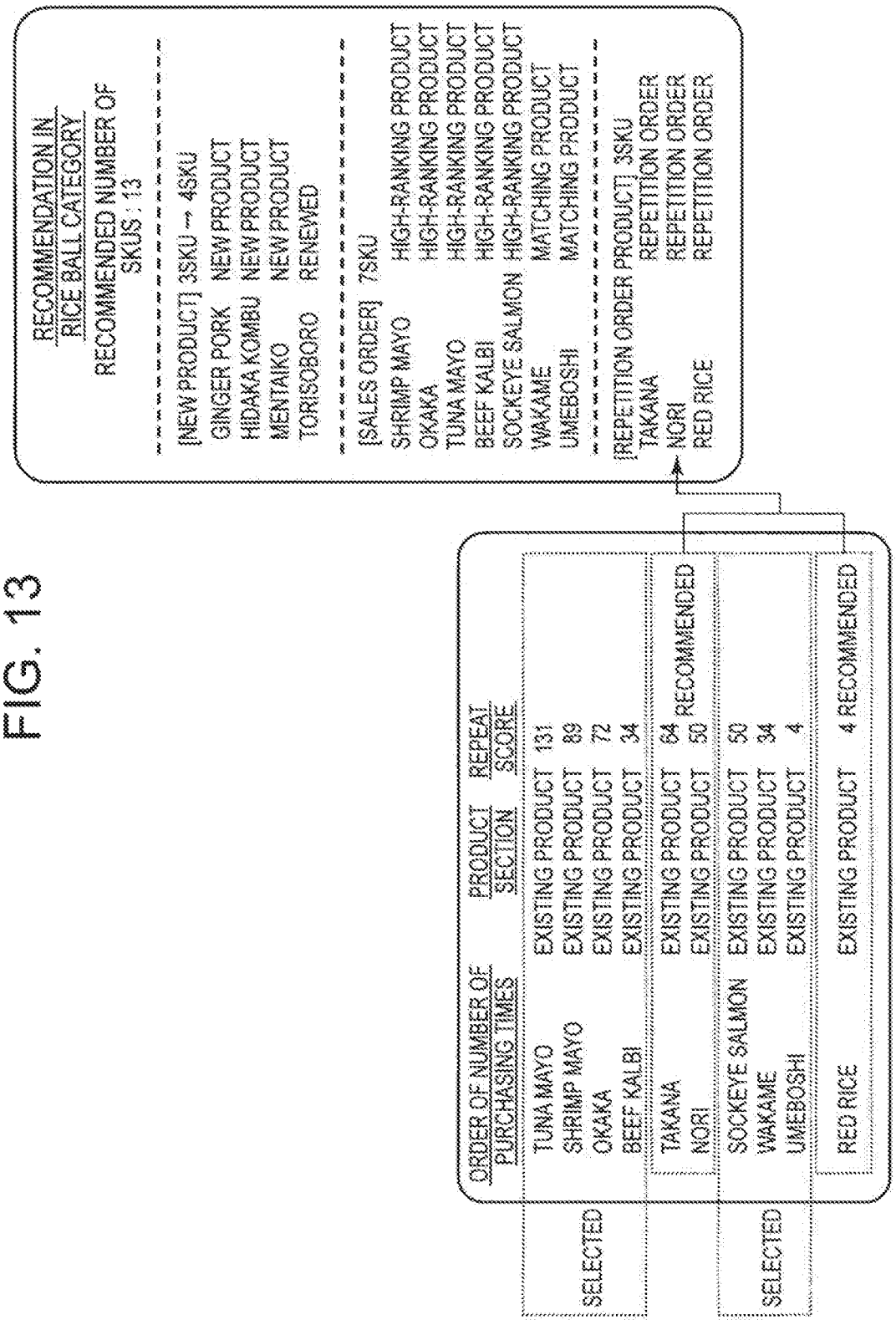
FIG. 13 is an explanatory diagram illustrating an example of processing of selecting repetition order products.

FIG. 13 is an explanatory diagram illustrating an example of processing of selecting repetition order products. The example in FIG. 13 illustrates that products are selected in descending order of the high repetition degree score, namely "Takana (pickled mustard leaf)," "Nori (dried laver)," and "red rice" among the products not having been selected yet.

In addition, in the case where a product included as an assortment target is not selected, the recommended assortment determination unit 12 may intentionally add the product in response to a user's or any other's instruction to revise the recommended number of SKUs. Similarly, in the case where a product not required to be included as an assortment target is selected, the recommended assortment determination unit 12 may intentionally delete the product in response to a user's or any other's instruction to revise the recommended number of SKUs.

The transmission unit 13 transmits the calculated recommended number of SKUs for each store and the selected recommended assortment list to the corresponding store terminal 20.

The recommended SKU number calculation unit 11, the recommended assortment determination unit 12, and the transmission unit 13 are implemented by the CPU of a computer that acts according to programs (an inventory management program and an assortment recommendation program). For example, the programs may be stored in the storage unit 14 and the CPU may read the programs to act as the recommended SKU number calculation unit 11, the recommended assortment determination unit 12, and the transmission unit 13 according to the programs. Furthermore, each of the recommended SKU number calculation unit 11, the recommended assortment determination unit 12, and the transmission unit 13 may be implemented by dedicated hardware.

Moreover, in this exemplary embodiment, description has been made on the case where the recommended assortment determination unit 12 performs the process of calculating the first composition rate, the process of calculating the second composition rate, and the process of selecting products. These processes may be implemented by respective means independent of each other (a first composition rate calculation unit, a second composition rate calculation unit, and a product selection unit).

The store terminal 20 includes an assortment determination unit 21, a transmission unit 22, and a storage unit 23. The storage unit 23 is implemented by, for example, a magnetic disk or the like.

The assortment determination unit 21 determines an assortment to be adopted on the basis of the transmitted recommended number of SKUs and the recommended assortment list and additionally determines the recommended number of SKUs. Specifically, the assortment determination unit 21 determines the products to be adopted according to an instruction of a person in charge or the like of each store and determines the final adopted number of SKUs. Moreover, the assortment determination unit 21 may store the determined adopted number of SKUs and the history of the adopted product in the storage unit 23.

The transmission unit 22 transmits the adopted number of SKUs determined on the store side to the headquarters server 10. In other words, the transmission unit 22 sends back the adopted number of SKUs determined in each store in response to the transmitted recommended number of SKUs to the headquarters server 10.

The assortment determination unit 21 and the transmission unit 22 are implemented by the CPU of the computer that acts according to a program (an assortment determination program). For example, the program may be stored in the storage unit 23 and the CPU may read the program and then act as the assortment determination unit 21 and the transmission unit 22 according to the program. Moreover, each of the assortment determination unit 21 and the transmission unit 22 may be implemented by dedicated hardware.

Figure 14:
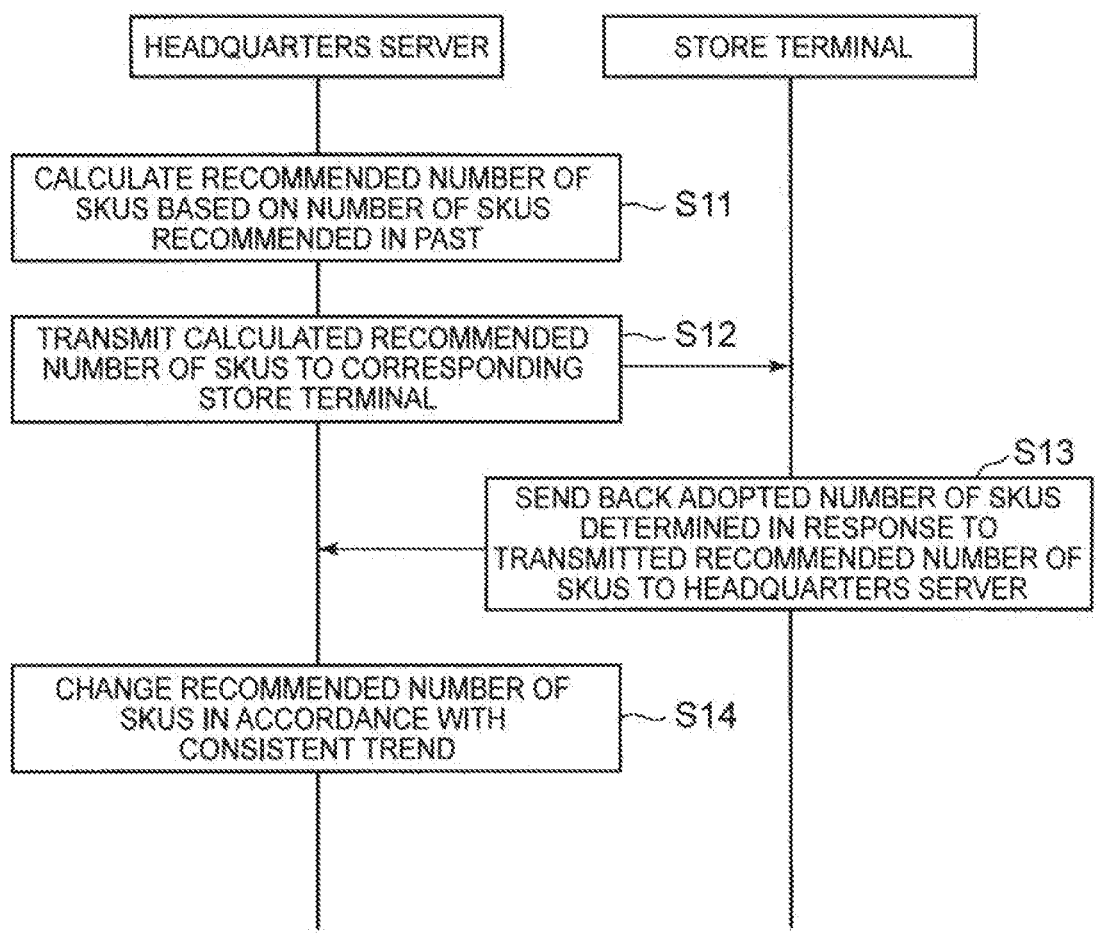
FIG. 14 is a sequence diagram illustrating an example of action of an inventory management system.

Subsequently, the actions of the inventory management system of this exemplary embodiment will be described. FIG. 14 is a sequence diagram illustrating an example of action of an inventory management system of this exemplary embodiment. The recommended SKU number calculation unit 11 of the headquarters server 10 calculates the recommended number of SKUs on the basis of the number of SKUs recommended in the past (step S11). The transmission unit 13 of the headquarters server 10 transmits the calculated recommended number of SKUs to the corresponding store terminal 20 (step S12).

The transmission unit 22 of the store terminal 20 sends back the adopted number of SKUs determined in each store in response to the transmitted recommended number of SKUs to the headquarters server 10 (step S13). In the case where the adopted number of SKUs sent back in response to the transmitted recommended number of SKUs changes continuously and in a consistent trend, the recommended SKU number calculation unit 11 of the headquarters server 10 changes the recommended number of SKUs in accordance with the trend (step S14). Hereinafter, the processes of step S12 and subsequent steps are repeated.

Figure 15:
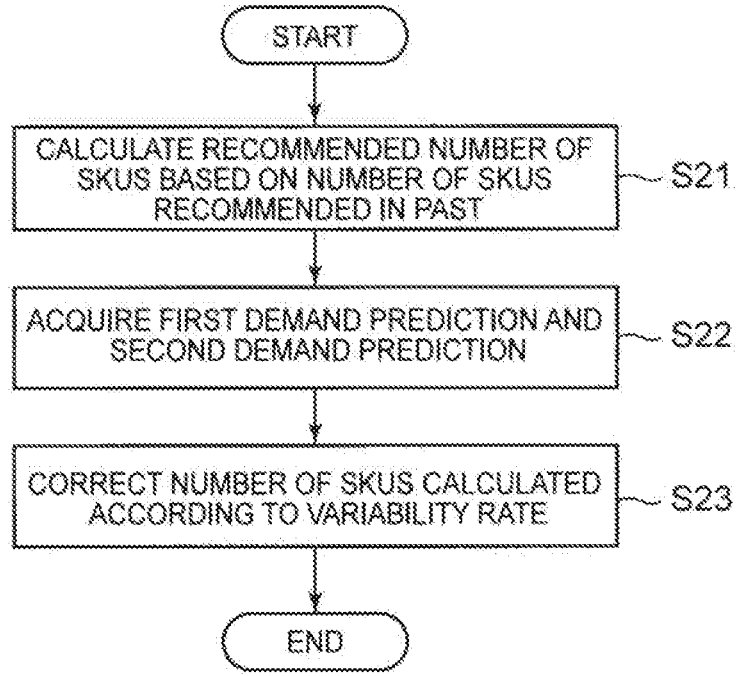
FIG. 15 is a flowchart illustrating an example of processing of correcting the number of SKUs calculated according to a variability rate of demand prediction.

FIG. 15 is a flowchart illustrating an example of processing of correcting the number of SKUs calculated according to a variability rate of demand prediction. The recommended SKU number calculation unit 11 of the headquarters server 10 calculates the recommended number of SKUs on the basis of the number of SKUs recommended in the past (step S21). Furthermore, the recommended SKU number calculation unit 11 acquires the demand prediction of the Nth week (first demand prediction) and the demand prediction of the (N+1)th week (second demand prediction) (step S22).

Furthermore, in the case where the variability rate of the second demand prediction relative to the first demand prediction exceeds a threshold value, the recommended SKU number calculation unit 11 corrects the number of SKUs calculated according to the variability rate (step S23). Incidentally, the processes of steps S22 and S23 may be performed before or after the step S14 of FIG. 14.

Figure 16:
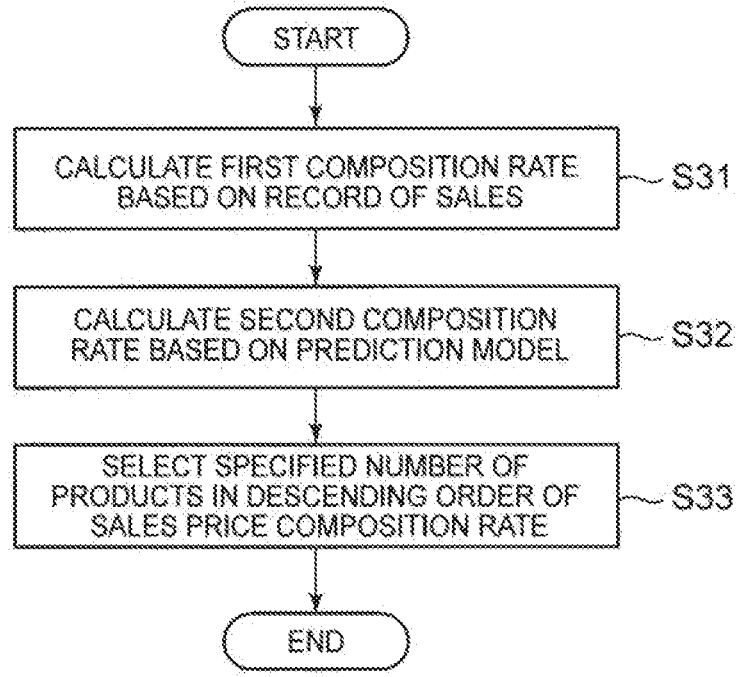
FIG. 16 is a flowchart illustrating an example of action of determining a recommended assortment.

FIG. 16 is a flowchart illustrating an example of action of determining a recommended assortment. The recommended assortment determination unit 12 calculates the first composition rate on the basis of a record of sales of a target store for a predetermined past period (step S31). Moreover, the recommended assortment determination unit 12 calculates the second composition rate on the basis of a prediction model for predicting the sales price composition rate of a single item of a product (step S32). Thereafter, the recommended assortment determination unit 12 selects a specified number of products in descending order of the sales price composition rate out of the products for which the first composition rate is calculated and the products for which the second composition rate is calculated (step S33).

As described hereinabove, in this exemplary embodiment, the recommended SKU number calculation unit 11 calculates the recommended number of SKUs on the basis of the number of SKUs recommended in the past and the transmission unit 13 transmits the calculated recommended number of SKUs to the store terminal. In addition, in the case where the adopted number of SKUs sent back from a store in response to the transmitted recommended number of SKUs changes continuously and in a consistent trend, the recommended SKU number calculation unit 11 changes the recommended number of SKUs for the store in accordance with the trend.

According to the above configuration, an appropriate recommended number of SKUs managed by each store can be determined in a business form in which the headquarters manages respective stores. Moreover, the recommended SKU number calculation unit 11 makes decision on the basis of a continuous trend, thereby preventing the recommended number of SKUs from being determined due to an irregular variation.

Moreover, in this exemplary embodiment, the recommended SKU number calculation unit 11 acquires the first demand prediction of the Nth week and the second demand prediction of the (N+1)th week, and in the case where the degree of variation (for example, variability rate) in the second demand prediction relative to the first demand prediction exceeds a threshold value, the recommended SKU number calculation unit 11 corrects the calculated number of SKUs in accordance with the degree.

Also according to this configuration, an appropriate recommended number of SKUs managed by each store can be determined in the business form in which the headquarters manages respective stores.

Moreover, in this exemplary embodiment, the recommended assortment determination unit 12 calculates the first composition information (the first composition rate) on the basis of a record of sales of a target store for a predetermined past period and calculates the second composition information (the second composition rate) on the basis of a prediction model of predicting a sales price composition rate of a single item of a product. The recommended assortment determination unit 12 then selects a specified number of products in descending order of price indicated by the sales price composition information (concretely, in descending order of composition rate) out of products for which the first composition rate is calculated and products for which the second composition rate is calculated.

According to the configuration, an assortment target can be recommended with products having no sales results prioritized, independently of the presence or absence of the sales result.

Figure 17:
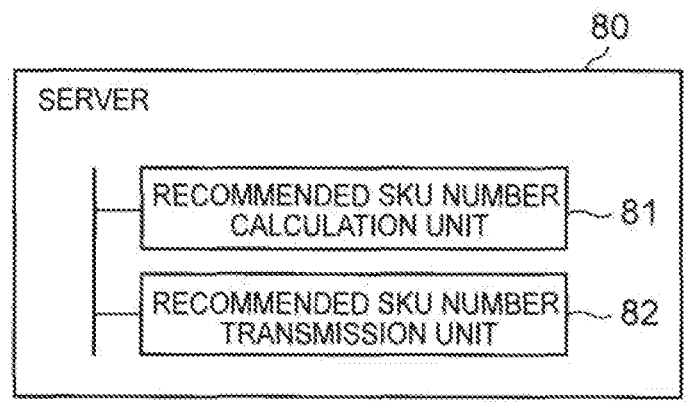
FIG. 17 is a block diagram illustrating an outline of a server according to the present invention.

Subsequently, the outline of the present invention will be described. FIG. 17 is a block diagram illustrating an outline of a server according to the present invention. A server 80 according to the present invention includes: a recommended SKU number calculation unit 81 (for example, the recommended SKU number calculation unit 11) that calculates a recommended number of SKUs on a basis of the number of SKUs recommended in the past (for example, the recommended number of SKUs of the (N−1)th week); and a recommended SKU number transmission unit 82 (for example, the transmission unit 13) that transmits the calculated recommended number of SKUs to a store terminal (for example, the store terminal 20).

Furthermore, in the case where an adopted number of SKUs sent back from a store in response to the transmitted recommended number of SKUs changes continuously and in a consistent trend, the recommended SKU number calculation unit 81 changes the recommended number of SKUs for the store in accordance with the trend.

According to the above configuration, an appropriate recommended number of SKUs managed by each store can be determined in the business form in which the headquarters manages respective stores.

Specifically, in the case where the adopted number of SKUs sent back from the store terminal in response to the transmitted recommended number of SKUs increased at least twice continuously, the recommended SKU number calculation unit 81 may increase the recommended number of SKUs for the store. In the case where the adopted number of SKUs sent back from the store terminal in response to the transmitted recommended number of SKUs decreased at least twice continuously, the recommended SKU number calculation unit 81 may decrease the recommended number of SKUs for the store.

Moreover, the recommended SKU number calculation unit 81 may calculate the recommended number of SKUs so as to change by a predetermined number, independently of a difference between the recommended number of SKUs and the adopted number of SKUs. Furthermore, the recommended SKU number calculation unit 81 may calculate the recommended number of SKUs so as to change in accordance with a predetermined degree of increase/decrease or of decrease. This configuration enables inhibition of an abrupt change in the recommended number of SKUs.

Moreover, in the case of determining the number of SKUs for a store not having the number of SKUs recommended in the past, the recommended SKU number calculation unit may use the number of SKUs for a store similar to the store for which the recommendation is made, as a reference recommended number of SKUs, to determine the number of SKUs for the store.

Figure 18:
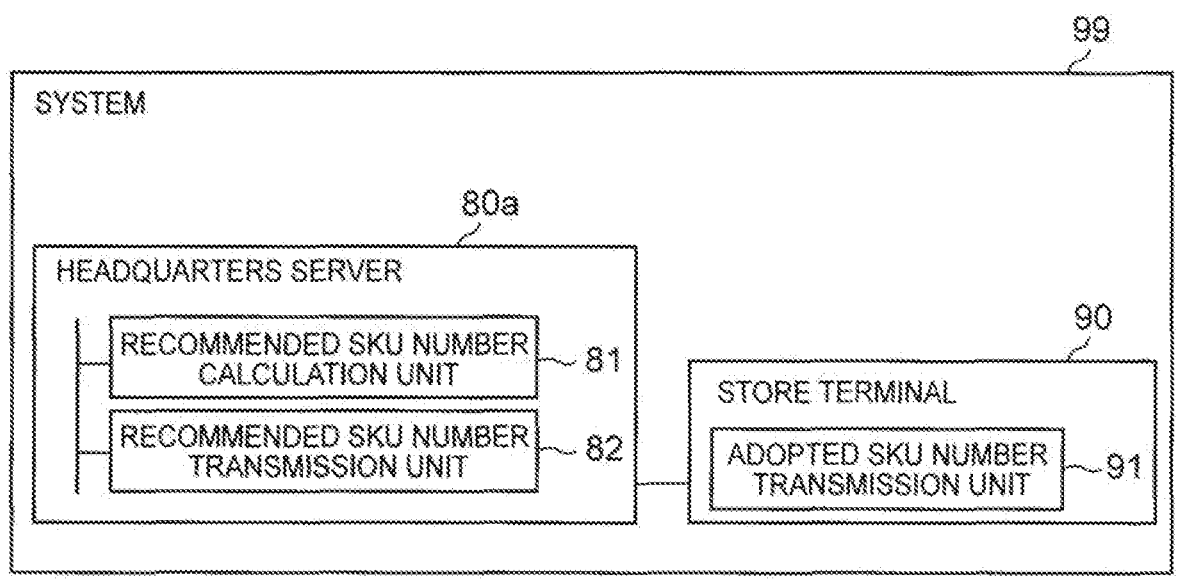
FIG. 18 is a block diagram illustrating an outline of a system according to the present invention.

Furthermore, FIG. 18 is a block diagram illustrating an outline of a system according to the present invention. An inventory management system 99 according to the present invention includes a headquarters server 80*a* and a store terminal 90. The configuration of the headquarters server 80*a* is the same as the configuration of the aforementioned inventory management server 80.

The store terminal 90 includes an adopted SKU number transmission unit 91 (for example, the transmission unit 22) that sends back an adopted number of SKUs, which is the number of SKUs determined in each store in response to the transmitted recommended number of SKUs, to the headquarters server 80*a*.

Also in this configuration, an appropriate recommended number of SKUs managed by each store can be determined in a business form in which the headquarters manages respective stores.

Although a part or all of the above exemplary embodiment can be described as in the following Supplementary notes, the present invention is not limited thereto.

(Supplementary note 1) A server including: a recommended SKU number calculation unit that calculates a recommended number of SKUs on the basis of a number of SKUs recommended in the past; and a recommended SKU number transmission unit that transmits the calculated recommended number of SKUs to a store terminal, wherein, in the case where an adopted number of SKUs sent back from a store in response to the transmitted recommended number of SKUs changes continuously and in a consistent trend, the recommended SKU number calculation unit changes the recommended number of SKUs for the store in accordance with the trend.

(Supplementary note 2) The server according to Supplementary note 1, wherein, in the case where the adopted number of SKUs sent back from the store terminal in response to the transmitted recommended number of SKUs increased at least twice continuously, the recommended SKU number calculation unit increases the recommended number of SKUs for the store, while, in the case where the adopted number of SKUs sent back from the store terminal in response to the transmitted recommended number of SKUs decreased at least twice continuously, the recommended SKU number calculation unit decreases the recommended number of SKUs for the store.

(Supplementary note 3) The server according to Supplementary note 1 or 2, wherein the recommended SKU number calculation unit calculates the recommended number of SKUs so as to change by a predetermined number, independently of a difference between the recommended number of SKUs and the adopted number of SKUs.

(Supplementary note 4) The server according to Supplementary note 1 or 2, wherein the recommended SKU number calculation unit calculates the recommended number of SKUs so as to change in accordance with a predetermined degree of increase or decrease.

(Supplementary note 5) The server according to any one of Supplementary notes 1 to 4, wherein, in the case of determining the number of SKUs for a store not having the number of SKUs recommended in the past, the recommended SKU number calculation unit determines the number of SKUs for the store by using the number of SKUs for a store similar to the store for which the recommendation is made, as a reference recommended number of SKUs.

(Supplementary note 6) A system including a headquarters server; and a store terminal, wherein the headquarters server includes: a recommended SKU number calculation unit that calculates a recommended number of SKUs on the basis of a number of SKUs recommended in the past; and a recommended SKU number transmission unit that transmits the calculated recommended number of SKUs to the store terminal, wherein the store terminal includes an adopted SKU number transmission unit that sends back an adopted number of SKUs, which is the number of SKUs determined in each store in response to the transmitted recommended number of SKUs, to the headquarters server, and wherein, in the case where the adopted number of SKUs sent back in response to the transmitted recommended number of SKUs changes continuously and in a consistent trend, the recommended SKU number calculation unit changes the recommended number of SKUs in accordance with the trend.

(Supplementary note 7) The system according to Supplementary note 6, wherein, in the case where the adopted number of SKUs sent back in response to the transmitted recommended number of SKUs increased at least twice continuously, the recommended SKU number calculation unit increases the recommended number of SKUs for the store and in the case where the adopted number of SKUs sent back in response to the transmitted recommended number of SKUs decreased at least twice continuously, the recommended SKU number calculation unit decreases the recommended number of SKUs for the store.

(Supplementary note 8) A method including the steps of: calculating a recommended number of SKUs on the basis of a number of SKUs recommended in the past; and transmitting the calculated recommended number of SKUs to a store terminal, wherein, in the case where an adopted number of SKUs sent back from a store in response to the transmitted recommended number of SKUs changes continuously and in a consistent trend, the recommended number of SKUs for the store is changed in accordance with the trend.

(Supplementary note 9) The method according to Supplementary note 8, wherein, in the case where the adopted number of SKUs sent back from the store terminal in response to the transmitted recommended number of SKUs increased at least twice continuously, the recommended number of SKUs for the store is increased, while, in the case where the adopted number of SKUs sent back from the store terminal in response to the transmitted recommended number of SKUs decreased at least twice continuously, the recommended number of SKUs for the store is decreased.

(Supplementary note 10) A recommended SKU determination method, wherein: a headquarters server calculates a recommended number of SKUs on the basis of a number of SKUs recommended in the past; the headquarters server transmits the calculated recommended number of SKUs to a store terminal; the store terminal sends back an adopted number of SKUs, which is the number of SKUs determined in each store in response to the transmitted recommended number of SKUs, to the headquarters server; and, in the case where the adopted number of SKUs sent back in response to the transmitted recommended number of SKUs changes continuously and in a consistent trend, the headquarters server changes the recommended number of SKUs in accordance with the trend.

(Supplementary note 11) The recommended SKU determination method according to Supplementary note 10, wherein, in the case where the adopted number of SKUs sent back in response to the transmitted recommended number of SKUs increased at least twice continuously, the headquarters server increases the recommended number of SKUs for the store and in the case where the adopted number of SKUs sent back in response to the transmitted recommended number of SKUs decreased at least twice continuously, the headquarters server decreases the recommended number of SKUs for the store.

(Supplementary note 12) A program causing a computer to perform: recommended SKU number calculation processing of calculating a recommended number of SKUs on the basis of a number of SKUs recommended in the past; and recommended SKU number transmission processing of transmitting the calculated recommended number of SKUs to a store terminal, wherein, in the case where an adopted number of SKUs sent back from a store in response to the transmitted recommended number of SKUs changes continuously and in a consistent trend, the recommended number of SKUs for the store is changed in accordance with the trend in the recommended SKU number calculation processing.

(Supplementary note 13) The program according to Supplementary note 12, wherein, in the case where the adopted number of SKUs sent back from the store terminal in response to the transmitted recommended number of SKUs increased at least twice continuously in the recommended SKU number calculation processing, the program causes the computer to increase the recommended number of SKUs for the store and, in the case where the adopted number of SKUs sent back from the store terminal in response to the transmitted recommended number of SKUs decreased at least twice continuously, the program causes the computer to decrease the recommended number of SKUs for the store.

Although the present invention has been described with reference to the exemplary embodiments and examples hereinabove, the present invention is not limited thereto. A variety of changes, which can be understood by those skilled in the art, may be made in the configuration and details of the present invention within the scope thereof.

This application claims priority to Japanese Patent Application No. 2016-183723 filed on Sep. 21, 2016, and the entire disclosure thereof is hereby incorporated herein by reference.

REFERENCE SIGNS LIST

10 Headquarters server
11 Recommended SKU number calculation unit
12 Recommended assortment determination unit
13 Transmission unit
14 Storage unit
20 Store terminal 21 Assortment determination unit
22 Transmission unit
23 Storage unit
100 Inventory management system

What is claimed is:

1. A server comprising:
a memory storing instructions; and
one or more processors configured to execute the instructions to:
calculate a recommended number of SKUs on the basis of a number of SKUs recommended in the past;
transmit the calculated recommended number of SKUs to a store terminal;
in the case where an adopted number of SKUs sent back from a store in response to the transmitted recommended number of SKUs changes continuously and in a consistent trend, change the recommended number of SKUs for the store in accordance with the trend; and
in the case of determining the number of SKUs for a store not having the number of SKUs recommended in the past, determine the number of SKUs for the store by using the number of SKUs for a store similar in scale or locational to the store for which the recommendation is made, as a reference recommended number of SKUs.

2. The server according to claim 1, wherein, in the case where the adopted number of SKUs sent back from the store terminal in response to the transmitted recommended number of SKUs increased at least twice continuously, the processor further executes instructions to increase the recommended number of SKUs for the store, while, in the case where the adopted number of SKUs sent back from the store terminal in response to the transmitted recommended number of SKUs decreased at least twice continuously, and decrease the recommended number of SKUs for the store.

3. The server according to claim 1, wherein the processor further executes instructions to calculate the recommended number of SKUs so as to change a predetermined number, independently of a difference between the recommended number of SKUs and the adopted number of SKUs.

4. The server according to claim 1, wherein the processor further executes instructions to calculate the recommended number of SKUs so as to change in accordance with a predetermined degree of increase or decrease.

5. The server according to claim 1,
wherein the processor further executes instructions to use at least one of a store floor area, the number of products handled, an area of a parking lot, an area of a storage room, and the number of employees as a viewpoint for deciding whether or not the store is similar in scale.

6. The server according to claim 1,
wherein the processor further executes instructions to use at least one of a distance from a station and a situation of a facing road, a business district or a residential area, the presence or absence of a parking space, and the number of neighboring competing stores as a viewpoint for deciding whether or not the store is similar in locational.

7. A system comprising:
a headquarters server; and
a store terminal,
wherein the headquarters server includes:
a hardware including a first processor;
a recommended stock keeping unit (SKU) number calculation unit, implemented by the first processor, that calculates a recommended number of SKUs on the basis of a number of SKUs recommended in the past; and
a recommended SKU number transmission unit, implemented by the first processor, that transmits the calculated recommended number of SKUs to the store terminal,
wherein the store terminal includes:
a hardware including a second processor; and
an adopted SKU number transmission unit, implemented by the second processor, that sends back an adopted number of SKUs, which is the number of SKUs determined in each store in response to the transmitted recommended number of SKUs, to the headquarters server, and
wherein, in the case where the adopted number of SKUs sent back in response to the transmitted recommended number of SKUs changes continuously and in a consistent trend, the recommended SKU number calculation unit changes the recommended number of SKUs in accordance with the trend, and
in the case of determining the number of SKUs for a store not having the number of SKUs recommended in the past, the recommended SKU number calculation unit determines the number of SKUs for the store by using the number of SKUs for a store similar in scale or locational to the store for which the recommendation is made, as a reference recommended number of SKUs.

8. The system according to claim 7, wherein, in the case where the adopted number of SKUs sent back in response to the transmitted recommended number of SKUs increased at least twice continuously, the recommended SKU number calculation unit increases the recommended number of SKUs for the store and in the case where the adopted number of SKUs sent back in response to the transmitted recommended number of SKUs decreased at least twice continuously, the recommended SKU number calculation unit decreases the recommended number of SKUs for the store.

9. A method comprising:
calculating a recommended number of stock keeping units (SKUs) on the basis of a number of SKUs recommended in the past; and
transmitting the calculated recommended number of SKUs to a store terminal,
wherein, in the case where an adopted number of SKUs sent back from a store in response to the transmitted recommended number of SKUs changes continuously and in a consistent trend, the recommended number of SKUs for the store is changed in accordance with the trend, and
in the case of determining the number of SKUs for a store not having the number of SKUs recommended in the past, the recommended SKU number calculation unit determines the number of SKUs for the store by using the number of SKUs for a store similar in scale or locational to the store for which the recommendation is made, as a reference recommended number of SKUs.

10. The method according to claim 9, wherein, in the case where the adopted number of SKUs sent back from the store terminal in response to the transmitted recommended number of SKUs increased at least twice continuously, the recommended number of SKUs for the store is increased, while, in the case where the adopted number of SKUs sent back from the store terminal in response to the transmitted recommended number of SKUs decreased at least twice continuously, the recommended number of SKUs for the store is decreased.

* * * * *